Figure 1:
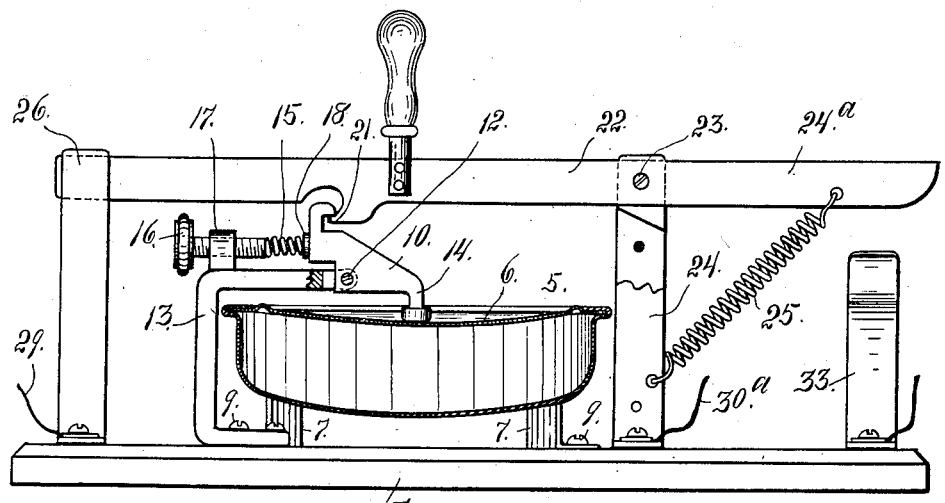

J. E. PAUL & J. M. STEWART.
THERMO ELECTRIC ALARM.
APPLICATION FILED NOV. 30, 1906. RENEWED OCT. 8, 1908.

909,818.

Patented Jan. 12, 1909.
2 SHEETS—SHEET 1.

Witnesses
Otto E. Hoddick
Dena Neison

Inventors
J. M. Stewart
J. E. Paul

Attorney

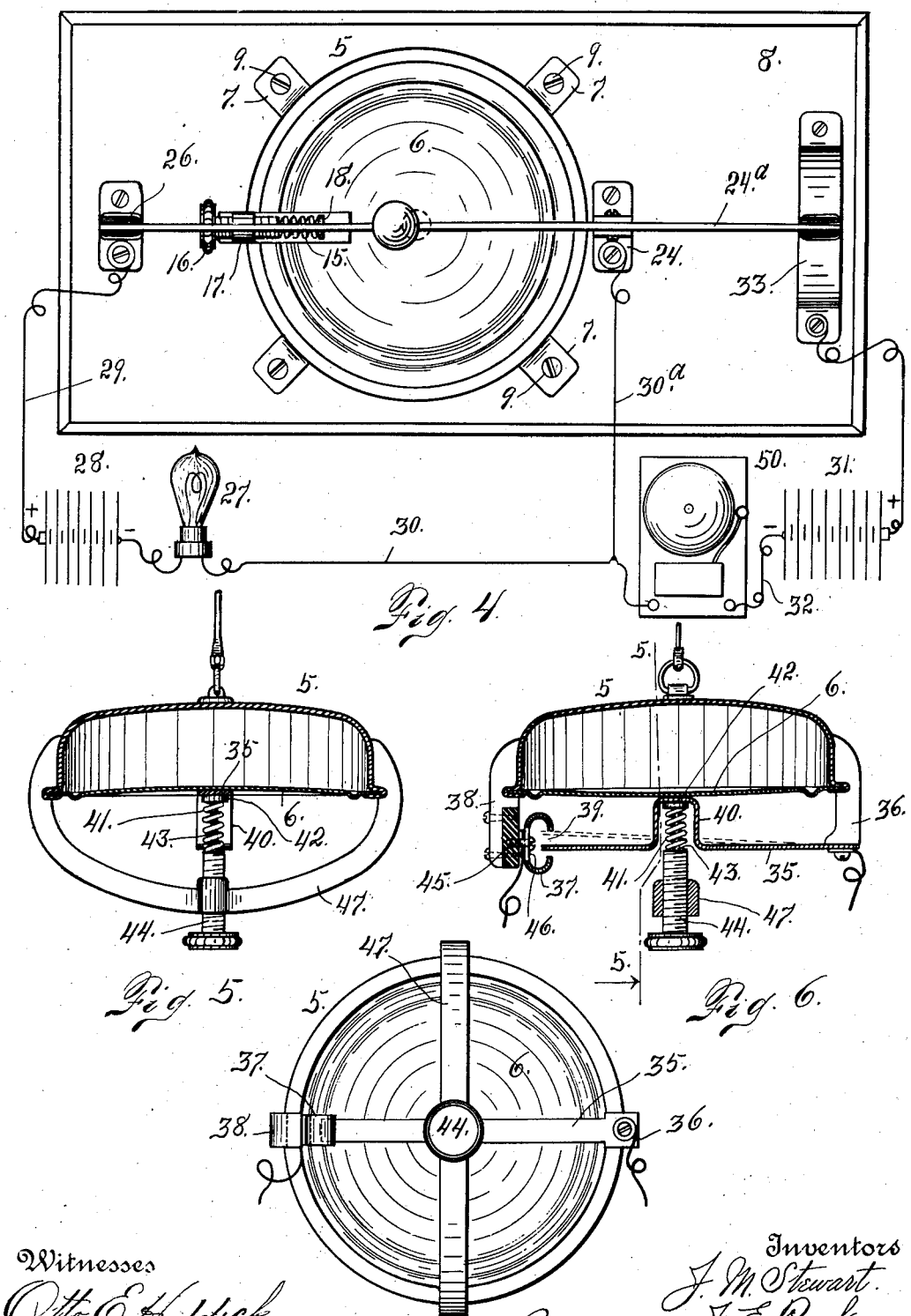

UNITED STATES PATENT OFFICE.

JOHN E. PAUL AND JAMES M. STEWART, OF DENVER, COLORADO, ASSIGNORS OF ONE-THIRD TO GEORGE W. DOLEZAL, OF DENVER, COLORADO.

THERMO-ELECTRIC ALARM.

No. 909,818.  Specification of Letters Patent.  Patented Jan. 12, 1909.

Application filed November 30, 1906, Serial No. 345,737. Renewed October 8, 1908. Serial No. 456,769.

*To all whom it may concern:*

Be it known that we, JOHN E. PAUL and JAMES M. STEWART, both citizens of the United States, residing at the city and county of Denver, and State of Colorado, have invented certain new and useful Improvements in Thermo-Electric Alarms; and we do declare the following to be a full, clear, and exact description of the invention, such as will enable others skilled in the art to which it appertains to make and use the same, reference being had to the accompanying drawings, and to the letters and figures of reference marked thereon, which form a part of this specification.

Our invention relates to improvements in thermo-electric alarms or means for automatically making and breaking an electric circuit by the variation of the temperature in the vicinity of the instrument. The device may of course be employed wherever a circuit is to be made or broken at predetermined temperatures.

The main feature of our improved device consists of a closed container or receptacle, the said receptacle being sealed with the air therein at any desired temperature. One side of this container or receptacle, consists of a flexible diaphragm preferably composed of metal, the said diaphragm being actuated by the expansion or contraction of the air within the container. For instance if the container is sealed with the air comparatively cool, the diaphragm will protrude inwardly. Now as the temperature rises the expansion of the air will force the diaphragm outwardly. This movement is sufficient to act to make or break an electrical circuit. For instance as the temperature rises sufficiently to expand the air to force the diaphragm outwardly, an arm may be moved to break one circuit and close another circuit, the latter being a signaling circuit. On the other hand if it is desired to give a signal to indicate an abnormal low temperature, the container may be sealed with the air at a temperature sufficiently to hold the diaphragm at its outward limit of movement, in which event, when the surrounding temperature reaches a limit too low for safety, the air will contract sufficiently to cause the diaphragm to move inwardly, and this movement may be sufficient to actuate a circuit making or breaking device as the case may be. Provision may be made for regulating the tension of the diaphragm in any suitable manner and by means of the tension device the diaphragm may be held against movement except when a predetermined degree has been reached.

The invention will be fully understood by reference to the accompanying drawing in which is illustrated an embodiment thereof.

Figure 3:
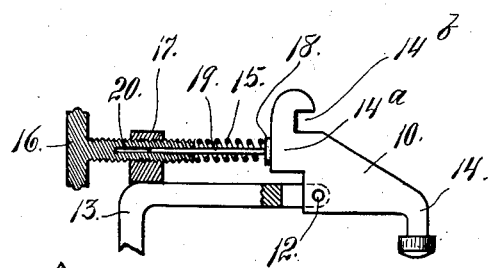
Figure 2:
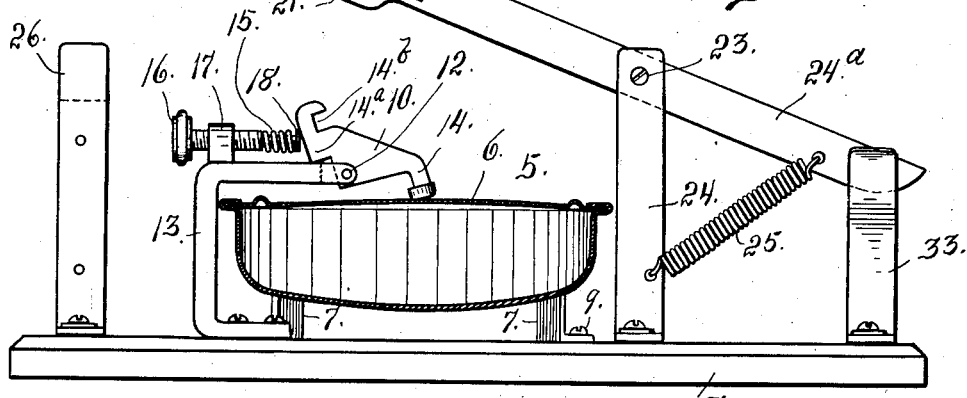

In this drawing, Figure 1 is a side elevation of the device shown partly in section. Fig. 2 is a similar view showing the parts in different relative positions. Fig. 3 is a detail view of a part of the device shown on a larger scale. Fig. 4 is a top plan view of the instrument illustrating two circuits, one containing an incandescent light and another a signaling bell. Fig. 5 is a sectional view of a container provided with tension means for controlling the diaphragm. This may be said to be a section taken on the line 5—5 Fig. 6. Fig. 6 is a section taken at right angles to the section shown in Fig. 5. Fig. 7 is an underneath view of the construction shown in Figs. 5 and 6.

The same reference characters indicate the same parts in all the views.

Let the numeral 5 designate a container or closed receptacle having a flexible diaphragm 6 on one side. This container or receptacle may be composed of any suitable material, but is preferably composed of metal or other suitable non-combustible material. The receptacle is mounted on suitable supports 7 secured to a base 8 by means of screws 9.

Referring now more especially to Figs. 1 to 4 inclusive, let 10 designate a trigger pivotally connected as shown at 12 with a support 13. One arm 14 of this trigger rests upon the central part of the diaphragm 6 and as shown in Fig. 1 of the drawing, the diaphragm is depressed, the trigger being held in a corresponding position by a spring 15 connected with a tension screw 16 threaded in a part 17. The spring acts upon a small disk 18 connected with a rod 19 arranged to telescope in a longitudinal perforation formed in the screw. The other arm 14ª of the lever is provided with a notch 14ᵇ adapted to engage a lip 21 formed upon a bar 22. This bar is pivotally mounted at 23 upon a standard 24. This bar extends on both sides of its pivot 23. The arm 24ª on one side of the pivot is connected by means of a spring 25 to a standard 24 whereby the tendency of the spring is to throw the bar to the position illustrated in Fig. 2. When the device is set or in position for use, however, as shown in Fig. 1, the trigger 10 locks the bar in engagement with a contact 26 whereby a circuit is closed through a lamp 27. This circuit is composed of a source of electricity 28, conductors 29, 30 and 30ª the standard 24, and the bar 22. Hence when the device is set as shown in Fig. 1, the circuit is normally closed through the lamp 27, but when the temperature rises in the vicinity of the instrument sufficiently to expand the air within the container 5 to force the diaphragm outwardly to the position shown in Fig. 2, the trigger will be actuated sufficiently to release the bar 22, when the spring 25 will serve to disengage the bar 22 from the contact 26, thus breaking the circuit through the lamp and closing the circuit through a signal bell 50 located in a circuit and composed of a source of electricity 31, a conductor 32, a branch 30ª of the conductor 30, the standard 24, the arm 24ª of the bar, and a contact or standard 33. The rise of temperature sufficient to actuate the diaphragm and force it to the position shown in Fig. 2, is predetermined through experiment or otherwise, and is such a temperature as is considered dangerous, making it important that the signal should be given. It is evident that provision may be made for closing the signaling circuit by the contraction of the air within the container, whereby the diaphragm is caused to move inwardly. In other words the abnormal high or abnormal low temperature may be indicated to the action of our improved device.

In the form of construction shown in Figs. 5, 6 and 7, the container is shown in a suspended position. The spring arm 35 is connected with an arm 36 secured to the container while a contact 37 is mounted on a support 38 also secured to the container. This contact is in the form of an elongated ring having an opening 39 within which one extremity of a spring arm 35 is adapted to vibrate.

The central part 40 of the arm 35 is depressed or bent inwardly toward the diaphragm 6. This depressed portion engages the central part of the diaphragm and is held in engagement therewith by a spring 41 acting on the head 42 of a pin 43 telescoping in a longitudinal perforation formed in a tension screw 44, the construction being substantially the same as that of the parts 15, 16, 18 and 19 in Fig. 3. Now if the circuit is closed when the diaphragm is moved inwardly as shown in Fig. 5, and as indicated by the dotted line position of the spring arm 35, when the temperature rises sufficiently to cause the air to force the diaphragm 6 outwardly, the circuit may be broken as shown by the full line position of the spring arm 35 in Fig. 6. The contact 37 is adjustable, since it is connected with the part 38 by a screw 45 passing through a slot 46 formed in the contact. By virtue of this adjustment the contact may be regulated so that the circuit may be closed when the diaphragm is in either of its extreme positions.

From the foregoing description the use and operation of our improved device will be readily understood. One of the important uses of the device may be considered for giving a signal in case of fire or when the temperature rises to the danger limit in the vicinity of the device. Assuming that the device is employed for this purpose, referring more especially to Figs. 1 to 4 inclusive, when the temperature rises beyond the danger limit, the air within the container will expand and force the diaphragm outwardly, breaking the circuit in which the lamp 27 is located and closing the circuit within which the signaling bell 50 is located thus giving the alarm. The object of the lamp circuit 27 is to indicate that the circuit-controlling device is in operating condition.

Having thus described our invention, what we claim is:

1. In a thermo-electric alarm, the combination with two circuits, signaling devices located in the respective circuits, and a movable device arranged to make or break the said circuits alternately, of a sealed fluid container provided with a flexible diaphragm adapted to be actuated by the expansion or contraction of the fluid within the container, and a suitable connection between the said diaphragm and the movable circuit-closing part whereby when the diaphragm is in one position the said movable part is held in position to close one circuit, while when the diaphragm is in the opposite position, the said movable part is caused to move into position to break one circuit and close the other circuit.

2. In a thermo-electric alarm, the combination with two circuits, signaling devices located in the respective circuits, and a movable device arranged to make or break the said circuits alternately, of a sealed fluid container provided with a flexible diaphragm adapted to be actuated by the expansion or contraction of the fluid within the container, and a suitable connection between the said diaphragm and the movable circuit-closing part whereby when the diaphragm is in one position the said movable part is locked in position to close one circuit, while when the diaphragm is in the opposite position, the said movable part is released and allowed to move into position to break one circuit and close the other circuit.

In testimony whereof we affix our signatures in presence of two witnesses.

JOHN E. PAUL.
JAMES M. STEWART.

Witnesses:
A. J. O'BRIEN,
DENA NELSON.